United States Patent
Richards et al.

(10) Patent No.: US 11,066,838 B2
(45) Date of Patent: Jul. 20, 2021

(54) WORK PLATFORM MOVER SYSTEM

(71) Applicant: The Boeing Company, Chicago, IL (US)

(72) Inventors: Charles M. Richards, Kent, WA (US);
James J. Troy, Issaquah, WA (US);
Stephen G. Moore, Renton, WA (US);
Kurt F. Webster, Los Gatos, CA (US)

(73) Assignee: THE BOEING COMPANY, Chicago, IL (US)

(*) Notice: Subject to any disclaimer, the term of this patent is extended or adjusted under 35 U.S.C. 154(b) by 6 days.

(21) Appl. No.: 16/033,438

(22) Filed: Jul. 12, 2018

(65) Prior Publication Data
US 2020/0018079 A1   Jan. 16, 2020

(51) Int. Cl.
*E04G 1/24* (2006.01)
*E04G 5/00* (2006.01)

(52) U.S. Cl.
CPC ............... *E04G 1/24* (2013.01); *E04G 5/00* (2013.01); *E04G 2001/242* (2013.01)

(58) Field of Classification Search
CPC ........ E04G 1/24; E04G 5/00; E04G 2001/242
See application file for complete search history.

(56) References Cited

U.S. PATENT DOCUMENTS

| | | | |
|---|---|---|---|
| 7,194,358 B2* | 3/2007 | Callaghan | B66B 5/0031 182/112 |
| 10,005,652 B1* | 6/2018 | Cui | B66F 11/04 |
| 10,167,181 B2* | 1/2019 | Xu | B66F 9/07568 |
| 2002/0179559 A1* | 12/2002 | Hashiguchi | B66F 11/044 212/281 |
| 2005/0224439 A1* | 10/2005 | Bean | B66F 11/046 212/280 |
| 2011/0014026 A1* | 1/2011 | Benzing | E04G 1/24 414/800 |
| 2012/0211301 A1* | 8/2012 | Clark | B66F 17/006 182/2.2 |
| 2018/0361595 A1* | 12/2018 | Troy | G01B 11/002 |
| 2019/0185304 A1* | 6/2019 | Lesquir | B66F 11/046 |
| 2019/0256226 A1* | 8/2019 | Shapoury | B60L 53/30 |

(Continued)

FOREIGN PATENT DOCUMENTS

| CN | 102701122 B | 3/2015 |
|---|---|---|
| EP | 1537036 A1 | 6/2005 |

(Continued)

OTHER PUBLICATIONS

EP Search Report dated Nov. 26, 2019 in re EP Application No. 19184874.6.

(Continued)

*Primary Examiner* — Daniel P Cahn
*Assistant Examiner* — Candace L Bradford
(74) *Attorney, Agent, or Firm* — Coats & Bennett, PLLC

(57) ABSTRACT

A mover system that moves a work platform relative to a target object. The mover system includes a drive vehicle configured to be attached to the work platform. Sensors are attached to the work platform that detect a distance between the sensors and the target object. Signals from the sensors are used to determine an alignment angle used for the operation of the drive vehicle to move the work platform into alignment and spacing relative to the work object.

20 Claims, 15 Drawing Sheets

(56) References Cited

U.S. PATENT DOCUMENTS

2019/0311555 A1* 10/2019 Troy ................. H04N 5/23296
2020/0018079 A1* 1/2020 Richards ................. B64F 5/00

FOREIGN PATENT DOCUMENTS

| JP | 2002087797 A | 3/2002 |
| JP | 2013052948 A | 3/2013 |
| KR | 20160000931 U | 3/2016 |

OTHER PUBLICATIONS

Wikipedia, "Holonomic (robotics)", online article, retrieved on Jun. 25, 2018, pp. 1-2, retrieved from: https://en.wikipedia.org/wiki/Holonomic_%28robotics%29.

* cited by examiner

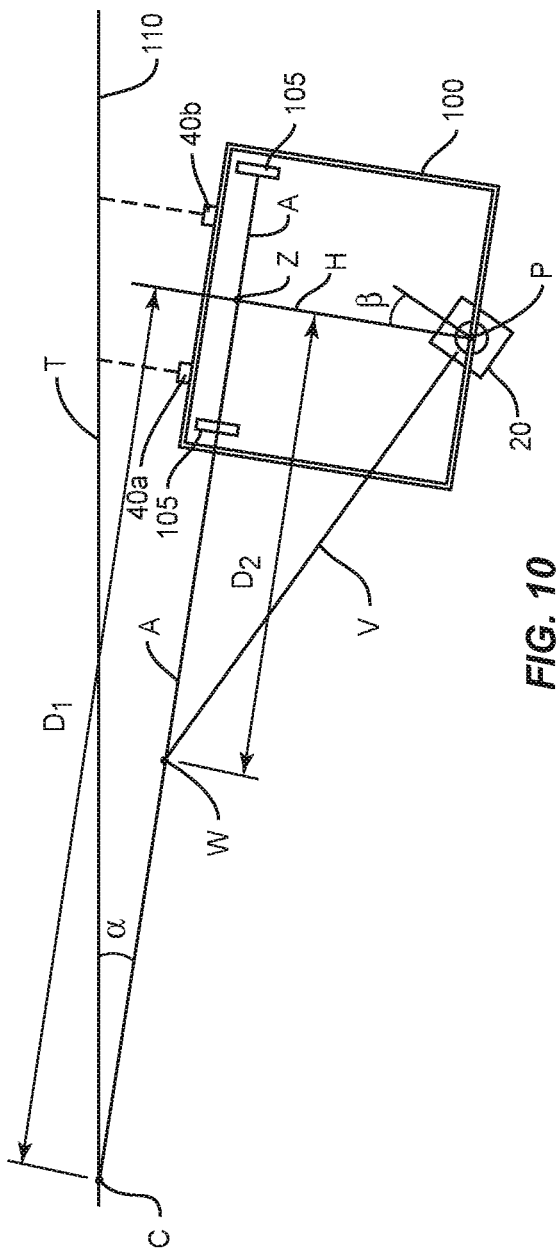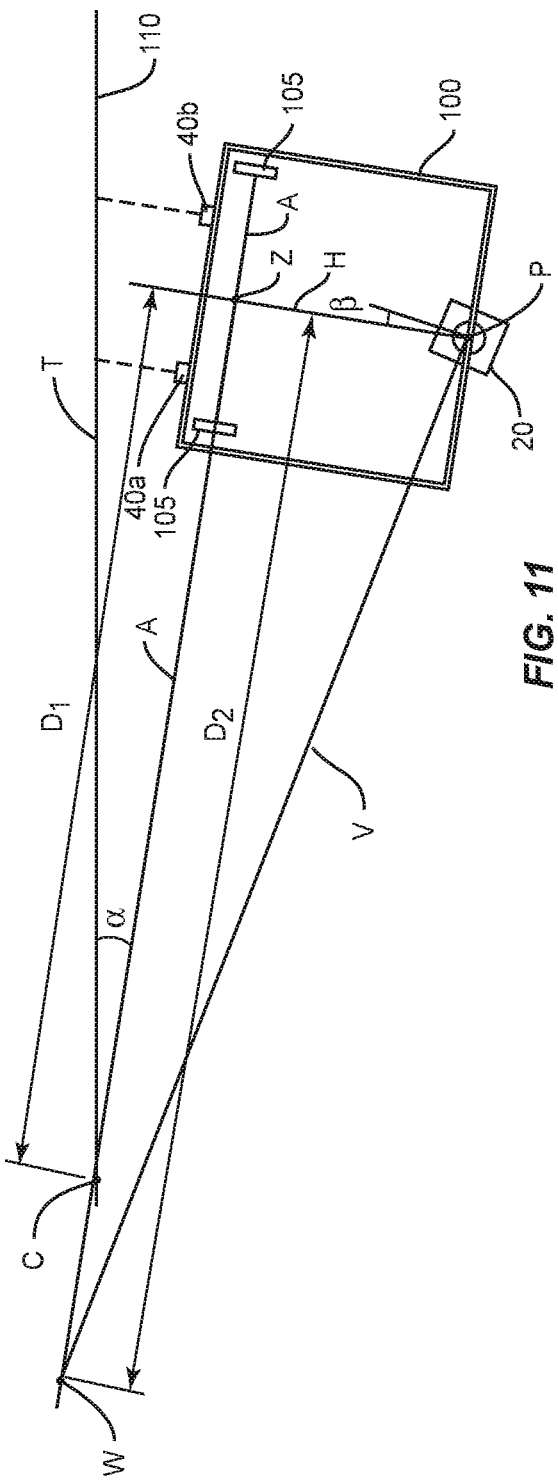

WORK PLATFORM MOVER SYSTEM

TECHNOLOGICAL FIELD

The present application is directed to a system for moving a work platform relative to a target object and, more particularly, to a system with a drive vehicle that is controlled based on real-time sensor feedback to calculate a distance and alignment of a work platform relative to a target object.

BACKGROUND

Many industrial settings use a work platform to position operators and/or equipment relative to a target object, such as a work piece. The work platform is often large to support multiple operators and/or equipment. Further, the platform can have large dimensions to position the operators and/or equipment relative to a large target object. One use is a work platform for use with a large commercial aircraft. The work platform can have a height in excess of twenty feet to perform various operations on the aircraft.

Current methods of moving and positioning a work platform include workers manually pushing and pulling the work platform. Because of the large size and weight of the work platform, this movement is often difficult and requires multiple of workers. Workers can potentially become injured due to the large forces necessary to move and position the work platforms.

It is often difficult for workers to accurately position the work platform relative to the target object. If the work platform is not properly positioned relative to the target object such as being too far away or spaced away from the desired position, it may be difficult for the workers and/or equipment to work on the target object. Another issue with manually moving the work platforms is the potential for damaging the target object. The work platforms can accidentally run into the target object during the movement. This is particularly likely when the work platform is required to be in very close position relative to the target object which is often required during various manufacturing processes.

SUMMARY

One aspect is directed to a method of aligning a work platform relative to a stationary target object. The method includes attaching a drive vehicle to the work platform. The method includes receiving signals from first and second sensors that are spaced apart on the work platform, the signals indicating a first distance between the first sensor and the target object and a second distance between the second sensor and the target object. The method also includes moving the work platform with the drive vehicle based on the signals and aligning the work platform relative to the target object and reducing a distance between the work platform and the target object.

In one aspect, the method also includes calculating based on the signals a target object angle between the work platform and the target object.

In one aspect, the method also includes sensing an angle of a forward motion of the drive vehicle relative to a longitudinal centerline of the work platform and adjusting an orientation of the drive vehicle relative to the work platform based on the angle.

In one aspect, the method also includes storing in a memory circuit on the drive vehicle distance variables of the first and second sensors and dimensional aspects of the work platform and the attachment location of the drive vehicle relative to the work platform.

In one aspect, the method also includes operating the drive vehicle and moving the work platform through a control unit prior to receiving signals from the first and second sensors.

In one aspect, the method also includes after attaching the drive vehicle to the work platform, elevating a section of work platform and limiting a number of wheels of the work platform that remain in contact with a work surface, the wheels remaining in contact with the work surface having a wheel rotation axis about which the work platform turns while being moved by the drive vehicle.

In one aspect, the method also includes receiving the signals from the first and second sensors with the signals comprising raw sensor data.

In one aspect, the method also includes adjusting an angular position of the drive vehicle relative to the work platform while moving the work platform with the drive vehicle with respect to the target object.

In one aspect, the method also includes stopping the drive vehicle when the work platform is aligned with the target object and is spaced a desired distance away from the target object.

One aspect is directed to a method to align a work platform relative to a stationary target object. The method includes attaching a drive vehicle to the work platform at a pivot point. The method includes receiving signals from first and second sensors that are spaced apart on the work platform, the signals indicating a first distance between the first sensor and the target object and a second distance between the second sensor and the target object. The method includes calculating based on the signals a target object angle between the work platform and the target object. The method includes calculating based on rotational sensor signals a drive vehicle angle between a forward movement direction of the drive vehicle and a longitudinal centerline of the work platform. The method includes calculating the target object angle and the drive vehicle angle while moving the work platform with the drive vehicle towards the target object and based on the target object angle and the drive vehicle angle completing a rotation aspect of a motion path of the work platform prior to reaching a zero offset distance between the work platform and the target object.

In one aspect, the method also includes based on the rotational sensor signals adjusting an angular position of the drive vehicle relative to the work platform at the pivot point while moving the work platform with respect to the target object.

In one aspect, the method also includes stopping the drive vehicle based on sensor data when the work platform reaches the zero offset distance.

In one aspect, the method also includes elevating a section of the work platform above a work surface such that a limited number of wheels of the work platform remain in contact with the work surface.

In one aspect, the method also includes extending a lift mechanism on the drive vehicle relative to a body of the drive vehicle and elevating the work platform and transferring a load from the work platform wheels onto the drive vehicle to improve the traction of the drive vehicle.

One aspect is directed to a system to align a work platform relative to a stationary target object. The system includes a drive vehicle with: a body; drive members attached to the body; a mount pivotally attached to the body, the mount configured to attach to the work platform; a processing circuit configured to control movement of the drive vehicle;

a first sensor attached to the work platform at a first position, the first sensor configured to detect a distance at the first position between the work platform and the target object; a second sensor attached to the work platform at a second position that is spaced away from the first position with the second sensor configured to detect a distance at the second position between the work platform and the target object; and a rotation sensor to sense an angle of the work platform relative to the drive vehicle. The processing circuit is configured to receive signals from the first and second sensors and the rotation sensor and based on the signals to control the movement of the drive vehicle to adjust a spacing and alignment between the work platform and the target object.

In one aspect, the system also includes a lift mechanism attached to the body and to the mount, the lift mechanism configured to elevate the mount relative to the body to lift the work platform, with the lifting also transferring a load from the work platform onto the drive vehicle to increase traction of the wheels of the drive vehicle.

In one aspect, the processing circuit is configured to calculate based on the signals from the first and second sensors a target object angle that is an angle between the work platform and the target object.

In one aspect, the processing circuit is configured to calculate based on readings from a sensor on the drive vehicle a drive vehicle angle that is an angle between a first line extending in a forward movement direction of the drive vehicle from a pivot point with the work platform and a second line extending from the pivot point and being perpendicular to a wheel rotation axis of the work platform and parallel to a longitudinal centerline of the work platform.

In one aspect, the system also includes a display mounted to the work platform and comprising at least one row of lights, the display configured to illuminate one or more of the lights based on the signals received from the first and second sensors.

In one aspect, the system also includes a control unit configured to communicate with the processing circuit and control the drive vehicle based on signals received from the control unit.

The features, functions and advantages that have been discussed can be achieved independently in various aspects or may be combined in yet other aspects further details of which can be seen with reference to the following description and the drawings.

BRIEF DESCRIPTION OF THE DRAWINGS

FIG. 10 is a schematic diagram illustrating a top view of a mover system positioning a work platform relative to a target object.

FIG. 11 is a schematic diagram illustrating a top view of a mover system positioning a work platform relative to a target object.

DETAILED DESCRIPTION

The present application is directed to a mover system that moves a work platform relative to a stationary target object. The mover system includes a drive vehicle configured to be attached to the work platform. Sensors are attached to the work platform and detect a distance between the sensors and the target object. Signals from the sensors are used to determine the alignment angle used for the operation of the drive vehicle to align and move the work platform relative to the work object.

Figure 1:
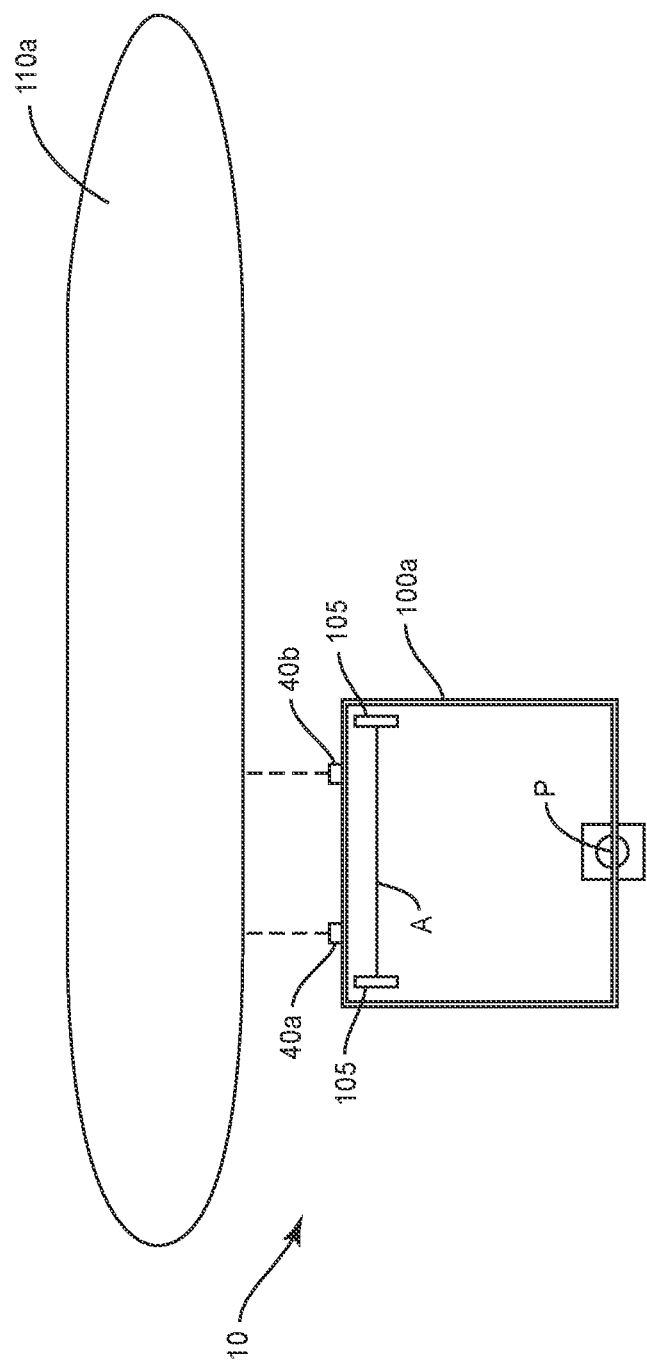
FIG. 1 is a schematic diagram illustrating a top view of a mover system to position a work platform relative to a target object.

FIG. 1 schematically illustrates a mover system 10 for moving a work platform 100a relative to a stationary target object 110a. As used herein, the work platform is generally referred to by reference number 100 and the target object by reference number 110. The mover system 10 includes a drive vehicle 20 that attaches to the work platform 100. The drive vehicle 20 is configured to move the work platform 100 about a pivot point along a wheel rotation axis A of the work platform 100 that extends between wheels 105 on the platform 100. The drive vehicle 20 is further configured to receive signals from sensors 40 indicating distances that the work platform 100 is spaced away from the target object 110. The drive vehicle 20 processes the distance information to determine spacing and alignment to steer the work platform 100 relative to the stationary target object 110.

Figure 2:
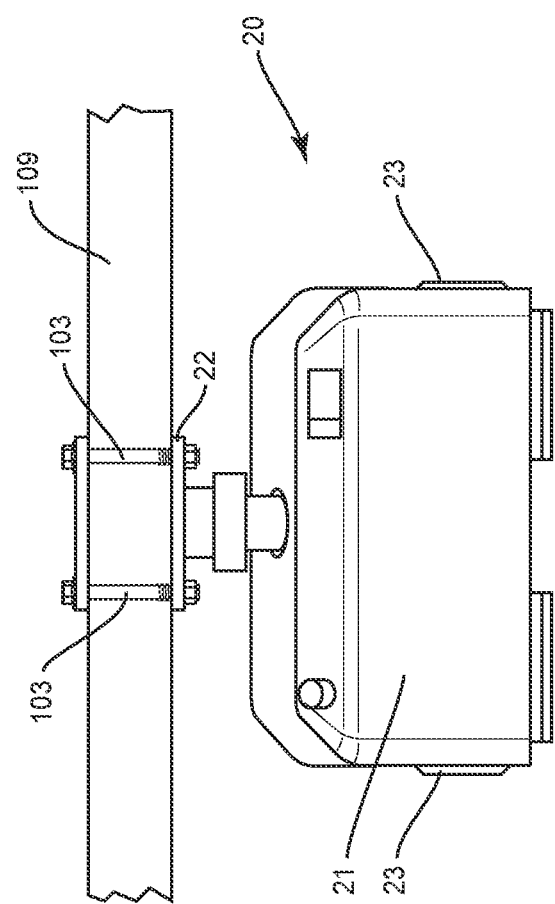
FIG. 2 is a rear perspective view of a drive vehicle attached to a work platform.
Figure 3:
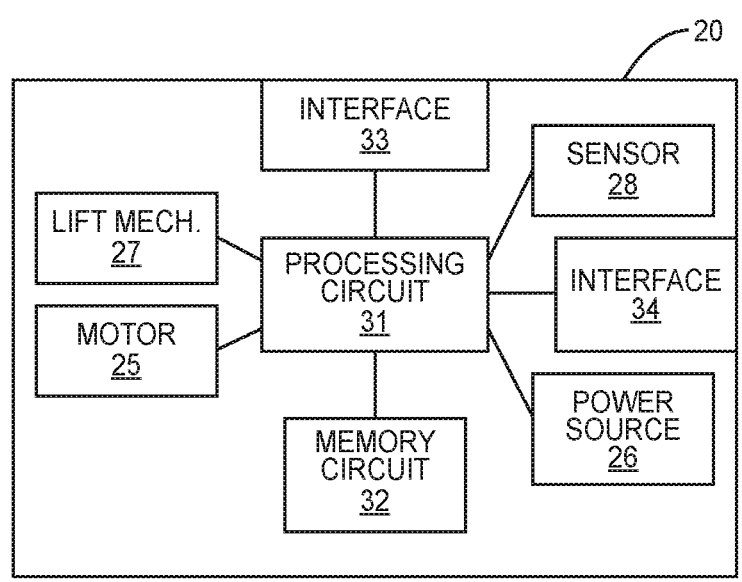
FIG. 3 is a schematic diagram of a drive vehicle.

FIG. 2 illustrate a drive vehicle 20 attached to a section 109 of the work platform 100. FIG. 3 schematically illustrates the components of the drive vehicle 20. The drive vehicle 20 includes a body 21 with a mount 22 configured to pivotally attach to the work platform 100. Fasteners 103 can attach the mount 22 to the work platform 100. In one design, the mount 22 includes a pair of plates that are pivotally connected together. Another design includes the mount 22 pivotal about a fastener that attaches the mount 22 to the body 21. Yet another design includes a gimbal connection between the mount 22 and the body 21. The pivoting connection forms a pivot point P that provides for the drive vehicle 20 to be positioned at different angular orientations relative to the work platform 110. This provides for the drive vehicle 20 to adjust the angular position of the work platform 100 relative to the target object 110. A rotation sensor 28 such as an absolute encoder or a potentiometer senses an angle at the pivot point P formed between the mount 22 and/or work platform 100 and the body 21. The angle can include a yaw axis angle which is the rotation about a vertical axis that extends through the pivot point P.

Figure 4:
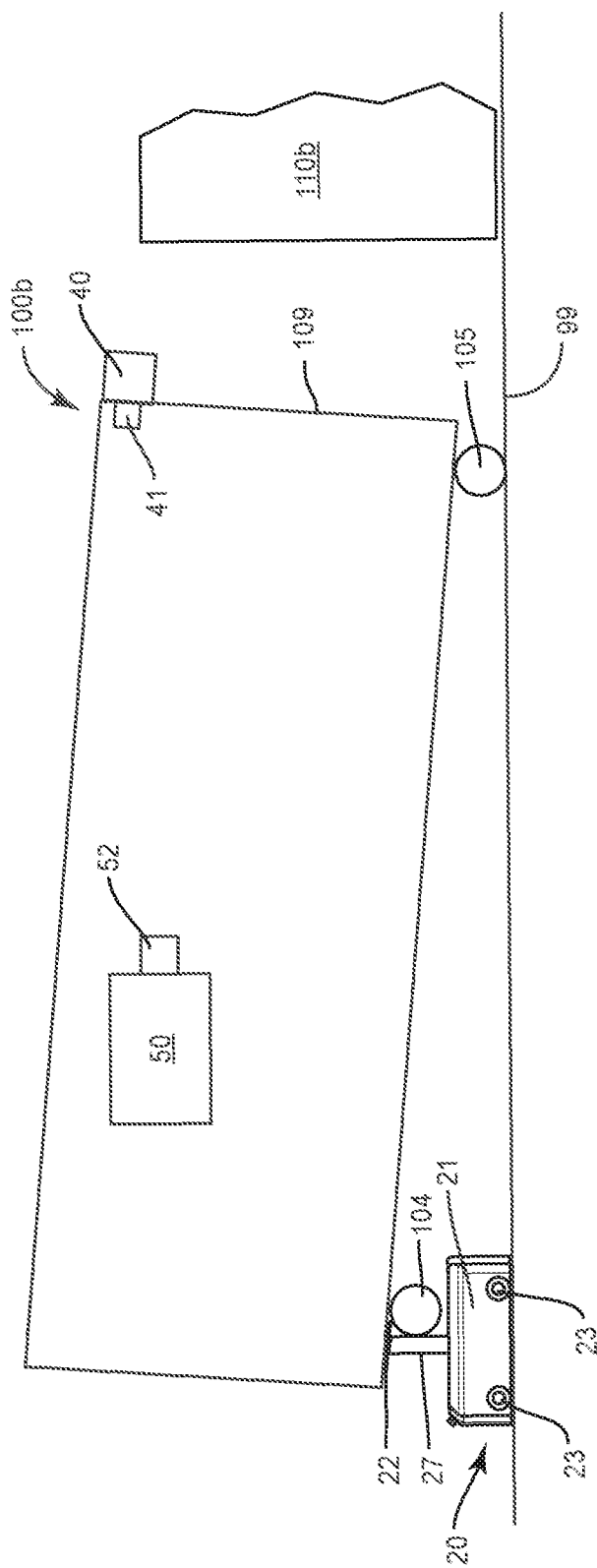
FIG. 4 is a schematic side view of a drive vehicle attached to and elevating a work platform.

A lift mechanism 27 on the drive vehicle 20 can selectively adjust a vertical position of the mount 22 relative to the body 21. The lift mechanism 27 provides for lifting a section of the work platform 100 above the work surface 99. As illustrated in FIG. 4, this can elevate one or more wheels 104 of the work platform 100 above the work surface 99. One or more wheels 105 of the work platform 100 remain in contact with the work surface 99 and form the wheel rotation axis A of the work platform 100 used for steering the work platform 100. The lift mechanism 27 can include an extendable arm with a telescoping, scissor, and/or pivoting configuration to move between a retracted position and an extended position. In the retracted position, the drive vehicle 20 can be moved underneath the work platform 100 to align and connect the mount 22. In the extended position, the mount 22 and section of the work platform 100 are elevated. The lift mechanism 27 can be pneumatically powered for movement between the extended and retracted positions.

The drive vehicle 20 also includes drive members 23 for movement across the work surface 99. The drive members 23 can include wheels or can include continuous tracks that are configured to directly contact against the work surface 99. The drive members 23 equipped with wheels can be configured as omni wheels, mecanum wheels, and swerve drive wheel modules for multi-axis movement.

The drive vehicle 20 includes one or more motors 25 to provide power to one or more of the drive members 23. This power drives the drive vehicle 20 to move the work platform 100 across the work surface 99. A gear train can extend between the motor 25 and the drive members 23. The drive vehicle 20 can include a single motor 25 that powers one or more of the drive members 23, or two or more motors 25 that each power one or more of the drive members 23. A power source 26 such as a rechargeable battery provides power to the motor 25 and other components on the drive vehicle 20. Power source 26 can also include a solar panel to recharge the power source 26.

The drive vehicle 20 also includes one or more processing circuits (shown as processing circuit 31) that can include one or more microprocessors, Application Specific Integrated Circuits (ASICs), or the like, configured with appropriate software and/or firmware. A computer readable storage medium (shown as memory circuit 32) stores data and computer readable program code that configures the processing circuit 31 to implement the techniques used to align the work platform 100. Memory circuit 32 is a non-transitory computer readable medium, and may include various memory devices such as random access memory, read-only memory, and flash memory.

An operator interface 33 includes one or more user input devices such as a keypad, touchpad, function keys, scroll wheel, gamepad, joystick, or other type of computer input device. The operator interface 33 can include a display screen, such as a conventional liquid crystal display (LCD) or touch screen display which also functions as a user input device.

A system interface 34 is configured to communications with a remote control unit 60 that is used by an operator to control the drive vehicle 20. The system interface 34 includes a transceiver configured to wirelessly communicate with the remote control unit 60. The system interface 34 can also provide for hardwire connection with the remote control unit 60. The system interface 34 can also communicate with other remote components, such as a system control unit that oversees multiple different aspects of the manufacturing process. The system interface 34 can also provide for the supply of power from a remote source. This power supply can be used to recharge the power source 26 and/or provide power to one or more the components on the drive vehicle 20.

FIG. 4 illustrates the drive vehicle 20 attached to a work platform 100b. The mount 22 is attached to the work platform 100b and is elevated above the body 21 by the lift mechanism 27. This positioning elevates one or more wheels 104 of the work platform 100 above the work surface 99. This positioning maintains the wheels 105 on the work surface 99 and provides the wheel rotation axis A of the work platform 100 that provides for moving the work platform 100 by the drive vehicle 20. Lifting the work platform 100 also applies a load to the drive vehicle 20. This load can increase the traction of the drive members 23 against the work surface 99.

The mover system 10 also includes sensors 40 that detect the distance between the work platform 100b and the target object 110b. One design includes a pair of sensors 40 spaced apart along the work platform 100 to detect distances at different sections of the work platform 100b. Other designs can include three or more sensors 40.

As illustrated in FIGS. 1 and 4, the sensors 40 are configured to be positioned along an edge 109 of the work platform 100 that faces the target object 110. Each sensor 40 can include an attachment member 41 to attach to the work platform 100. The attachment members 41 can receive fasteners to secure the sensors 40 to the work platform 100. The sensors 40 are further configured to be attached to different locations along the edge 109 of the work platform 100. This spacing provides for each sensor 40 to detect the distance of different sections of the work platform 100 away from the target object 110.

A variety of different sensors 40 can be used to detect the distance between the work platform 100 and the target object 110. Sensors 40 can include Lidar sensors with an emitter and a receiver. The emitters emit a pulsed laser light with the receiver configured to receive reflected pulses. The sensors 40 can also use various other sensing technologies, including but not limited to ultrasonic distance sensors or radar-based distance measurement sensors. The different sensors 40 that are attached to the work platform 100 can include the same or different sensing technologies.

Figure 5:
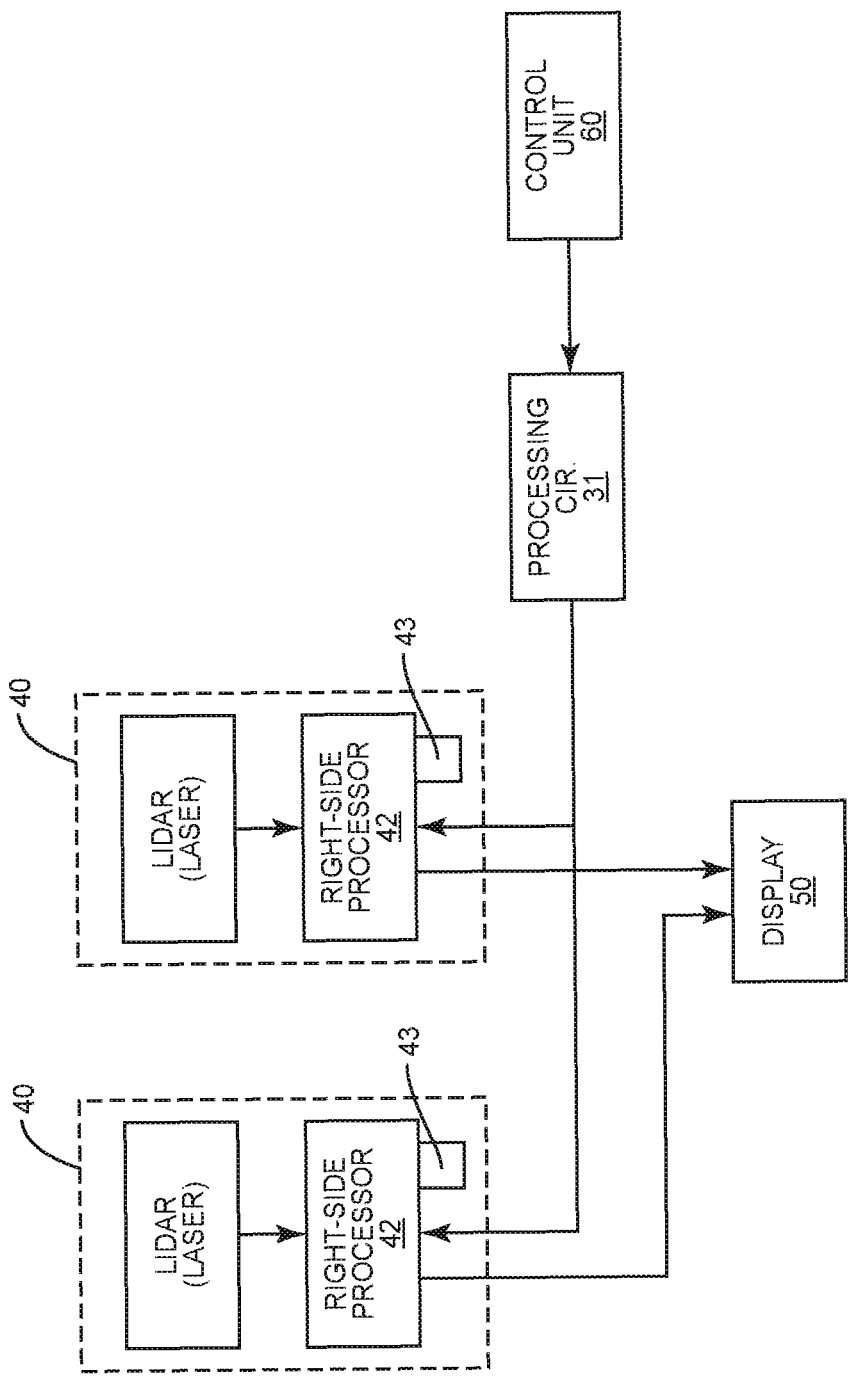
FIG. 5 is a schematic diagram of a mover system.

As illustrated in FIG. 5, a processing circuit 42 can be associated with each sensor 40. The processing circuits 42 can include one or more microprocessors, Application Specific Integrated Circuits (ASICs), or the like, configured with appropriate software and/or firmware. A computer readable storage medium (shown as memory circuit 43) stores data and computer readable program code that configures the processing circuit 42 to implement the techniques used during the functioning of the sensors 40. Each memory circuit 43 is a non-transitory computer readable medium, and may include various memory devices such as random access memory, read-only memory, and flash memory. Each processing circuit 42 receives signals from their respective sensor 40 and determines a distance between the sensor 40 and the target object 110. This information is then signaled to the processing circuit 31 to control the movement of the drive vehicle 20. The processing at the sensors 40 increases the response rate of the drive vehicle 20 to adjust the position and/or speed of the drive vehicle 20 during movement of the work platform 100. Additionally or alternatively, the processing circuit 31 at the drive vehicle 20 can receive raw sensor data and calculate a distance between the sensors 40 and the target object 110. In one design, there are no processing circuits 42 or memory circuits 43 associated with the sensors 40 as the raw sensor signals are received by the processing circuit 31 that performs the distance calculations. In one design, the sensors 40 provide a limited amount of processing of the sensor data. Processing circuit 31 performs additional processing on the data.

A control unit 60 can be used by an operator to remotely control the drive vehicle 20. The control unit 60 can include on/off, direction control, speed control, positioning of the lift mechanism 27, and other functions. The control unit 60 can include one or more user input devices such as a keypad, touchpad, function keys, scroll wheel, gamepad, joystick, or other type of computer input device. The control unit 60 can also include a display screen, such as a conventional liquid crystal display (LCD) or touch screen display which also functions as a user input device. The control unit 60 can provide a wireless transceiver for communication with the processing circuit 31 through the system interface 34. Additionally or alternatively, the control unit 60 can be hardwired to communicate with the drive vehicle 20.

The mover system 10 provides for operator control of the drive vehicle 20 and automatic control of the drive vehicle 20. Operator control occurs through the control unit 60. Automatic control provides for the processing circuit 31 to control the drive vehicle 20 in a real-time basis based on inputs from the sensors 40.

Figure 6:
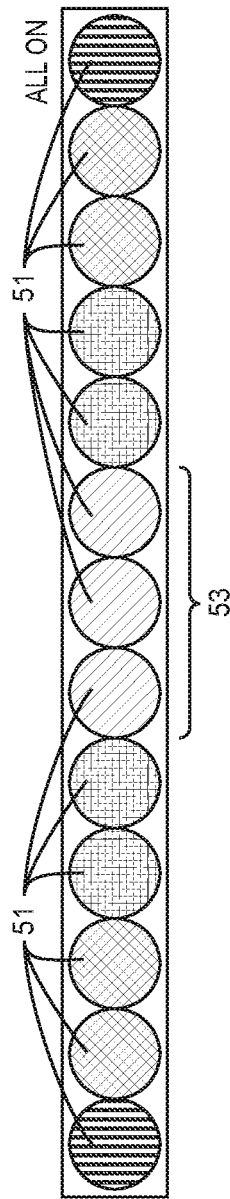
FIG. 6 is a schematic diagram of a display with lights.

To facilitate operator control, a display 50 provides a visual indication of the alignment and/or proximity of the work platform 100 to the target object 110. As illustrated in FIG. 6, the display 50 includes a number of separate lights 51 that are aligned in a horizontal row. Each of the lights 51 can be individually illuminated to indicate the alignment of the work platform 100 relative to the target object 110. The display 50 is controlled based on signals received from the processing circuits 42 of the sensors 40. In one design, the display 50 is controlled by the processing circuits 42. Additionally or alternatively, the display 50 can include a processing circuit and associated memory circuit to process the signals from the sensors 40 and determine the illumination of the various lights 51.

The display 50 is positioned for viewing by the operator that is controlling the drive vehicle 20 with the control unit 60. As illustrated in FIG. 4, the display 50 can include an attachment member 52 to attach to the work platform 100. The display 50 can also be positioned at other locations, including but not limited to the target object 110, and on a stand in proximity to the work platform 100 and/or the target object 110.

The lights 51 are individually controlled and adjustable between an on state (i.e., illuminated state) and an off state (i.e., non-illuminated state). The lights 51 can be illuminated in various configurations to provide a visual indication to the user of the relative position of the work platform 100 and the target object 110.

Figure 7A:
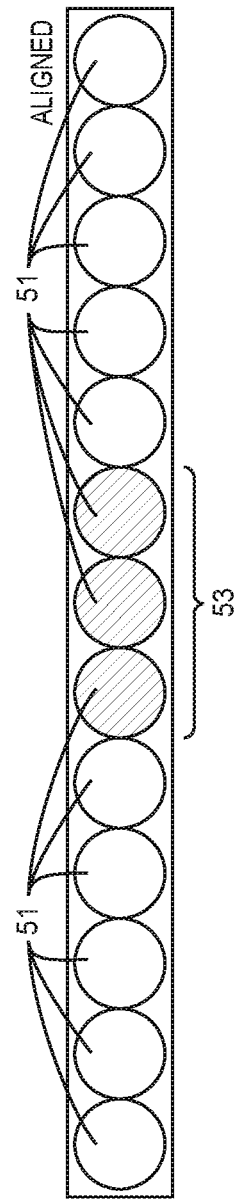
FIGS. 7A-7B are schematic diagrams of a display with lights.
Figure 7B:
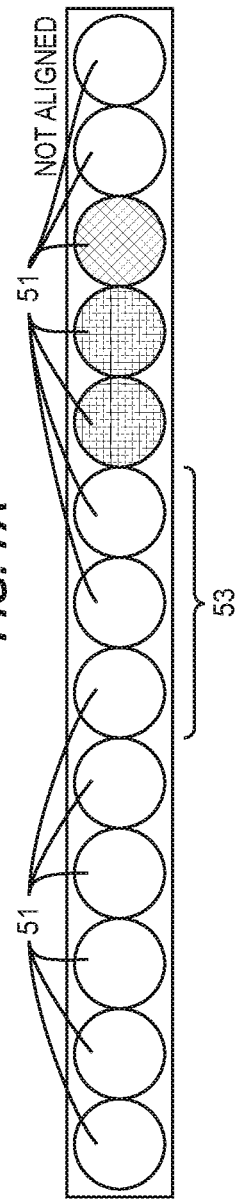

FIG. 7A includes a lighting configuration with just limited number of lights 51 being in the on state within a central section 53 of the display. Lights 51 away from the central section 53 are in the off state. This provides a visual indication that the work platform 100 is aligned with the target object 110. FIG. 7B includes a lighting configuration visually indicating that the work platform 100 is not aligned with the target object 110. This includes a limited number of illuminated lights 51 that are away from the central section 53 of the display 50. The remainder of the lights 51 are not illuminated, including the lights at the central section 53. The extent of misalignment can be visually indicated by the distance the illuminated lights 51 are away from the central section 53. Illumination of lights 51 adjacent to the central section 53 can indicate a relatively small amount of misalignment. Illumination of lights 51 at the outer edges of the display 50 can include a greater amount of misalignment.

The various lights 51 can also include different colors to provide an additional visual indication of the positioning. This can include the lights 51 at the central section 53 being a first color, and lights 51 away from the central section 53 being one or more different colors. In one design, the lights have different colors based on the distance away from the central section 53. The lights 51 can progressively change the farther away from the central section 53 to visually indicate the extent of misalignment. By way of example, the lights 51 of the central section 53 can be green. Lights 51 adjacent to the central section 53 can be yellow indicating a slight amount of misalignment. Lights 51 on the outer side of the yellow lights are orange indicating a greater amount of misalignment. Lights 51 on the outer periphery of the display 50 can be red indicating an extreme amount of misalignment.

Figure 8A:
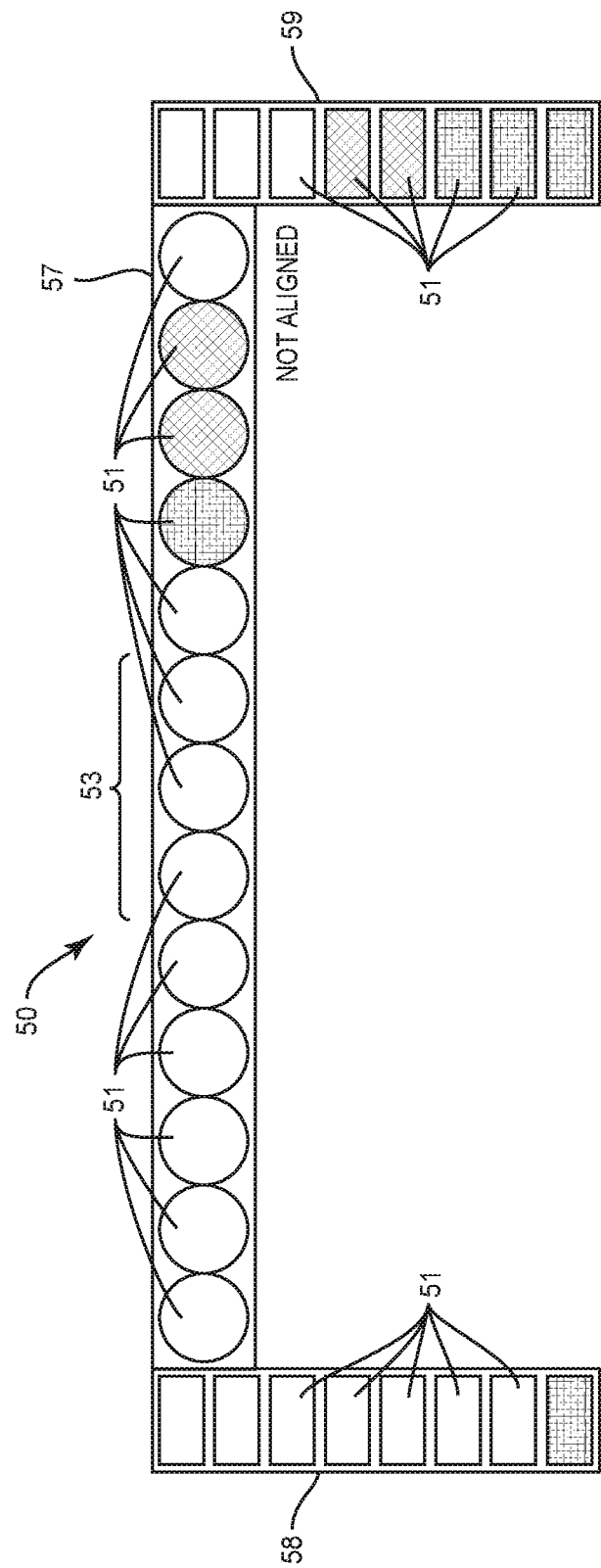
FIGS. 8A-8C are schematic diagrams of a display with lights.

FIG. 8A includes another display 50 to visually indicate the alignment of the work platform 100 relative to the target object 110. The display 50 includes a first section 57 with a horizontal row of lights 51, a second section 58 that with a vertical column of lights 51, and a third section 59 with another vertical column of lights 51. The second and third sections 58, 59 can be perpendicular to the first section 57. The first section 57 can visually indicate the alignment of the work platform 100 relative to the target object 110. The second section 58 visually indicates the distance the first sensor 40a is away from the target object 110, and the third section 59 visually indicates the distance the second sensor 40b is away from the target object 110.

FIG. 8A includes the display 50 illuminated when the work platform 100 is not aligned with the target object 110. Lights 51 away from the central section 53 are illuminated (and the lights 51 of the central section 53 are not illuminated). A comparison of the second and third sections 58, 59 visually indicates that the first sensor 40a corresponding to the second section 58 is farther away from the target object 110 than the second sensor 40b (that corresponds to the third section 59). This is because fewer lights 51 are illuminated in the second section 58 than the third section 59.

Figure 8B:
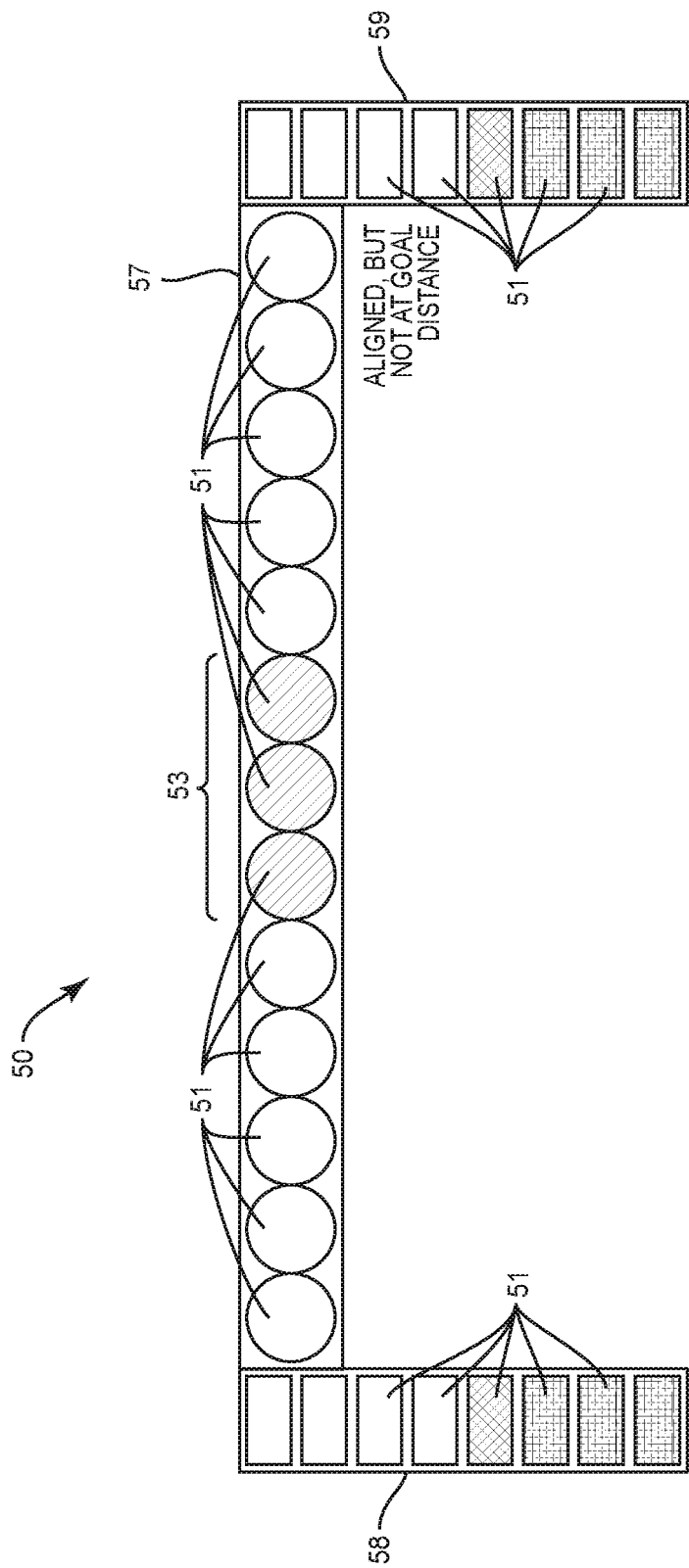

FIG. 8B includes the display 50 with the work platform 100 being aligned with the target object 110. Lights 51 within the central section 53 of the first section 57 are illuminated with the other lights 51 being off. The second and third sections 58, 59 indicate that the work platform 100 is still spaced away from the target object 110. Lights 51 along a lower portion of the second and third sections 58, 59 are illuminated with the lights along upper portions being off. This visually indicates the extent of the distance remaining between the work platform 100 and the target object 110. Further, the second and third sections 58, 59 indicate that the work platform 100 is aligned with the target object 110 since the same lights 51 are illuminated in each of the first and second sections 58, 59.

Figure 8C:
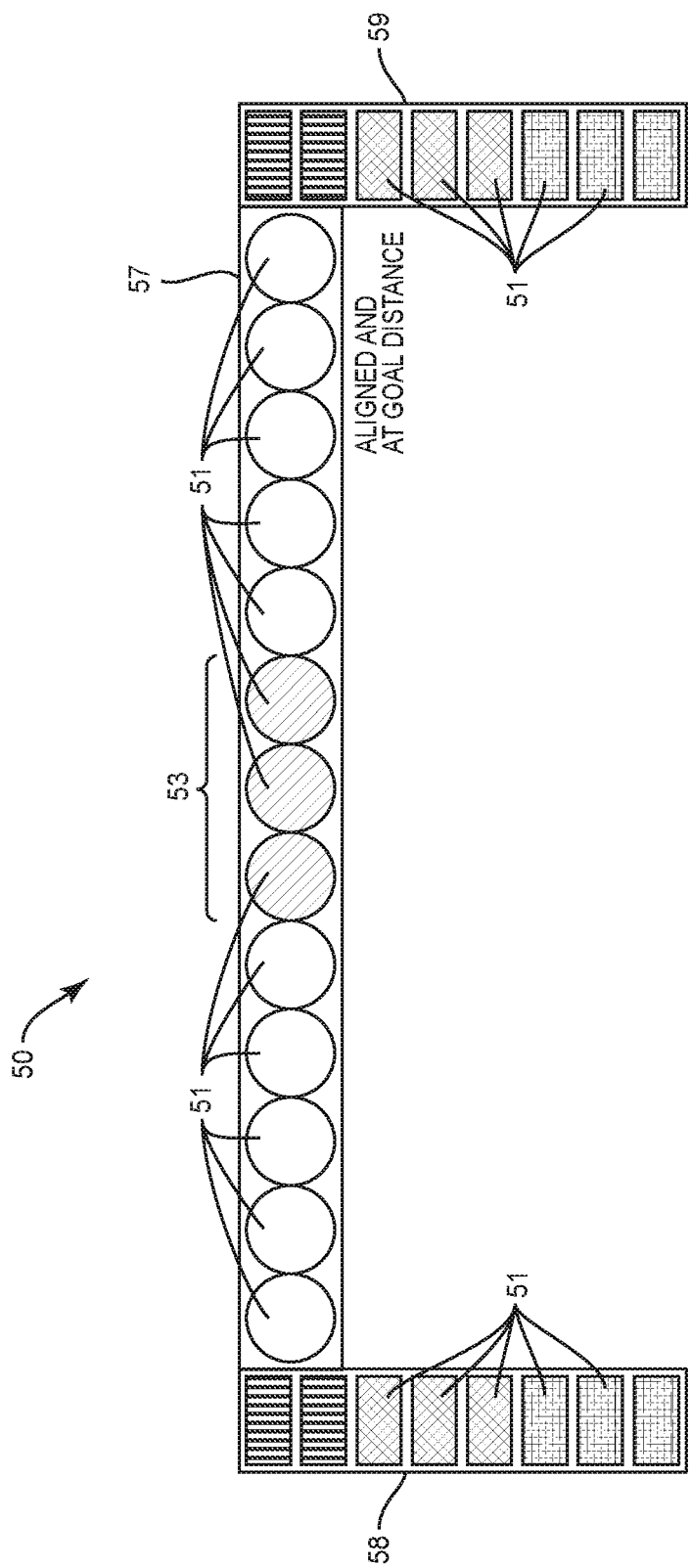

FIG. 8C illustrates the display 50 with the work platform 100 aligned with and at the desired distance away from the target object 110. The lights 51 within the central section 53 of the first section 57 are illuminated with the other lights 51 being off. This indicates that the work platform 100 is aligned with the target object 110. Further, each of the lights 51 along the second and third sections 58, 59 are illuminated. This visually indicates that the work platform 100 is aligned and is the desired distance away from the target object 110.

In some designs, a single display 50 is used for visual observation by the operator. Other designs can include two or more displays 50. This can include a separate display 50 associated with each sensor 40. In one specific design, two displays 50 are used with each connected to one of the sensors 40. Individually connecting each display 50 to a sensor 40 can be more straight-forward to configure.

The desired distance away from the target object 110 can vary depending upon the context of use. This can include the sensors 40 being located against the target object 110 or being spaced various distances away from the target object 110. The desired distance can be pre-programmed into the memory circuits 32, 42. Additionally or alternatively, the desired distance can be input by an operator.

Figure 9:
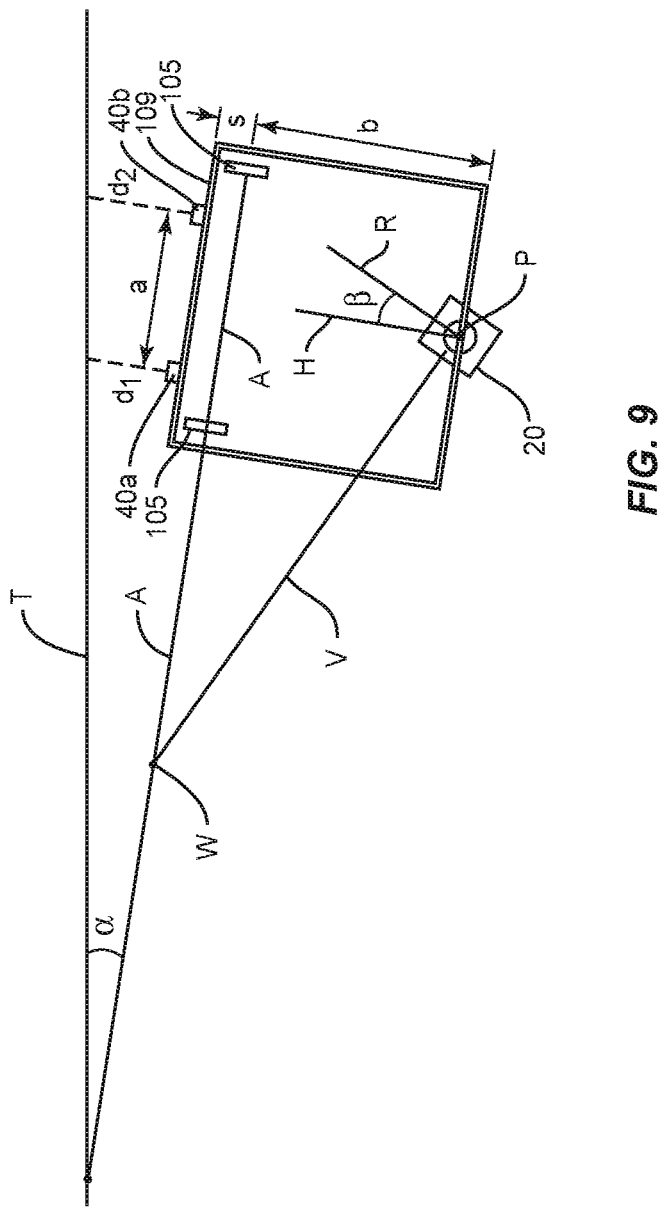
FIG. 9 is a schematic diagram illustrating a top view of a mover system positioning a work platform relative to a target object.

As illustrated in FIG. 9, the drive vehicle 20 turns relative to the work platform 100 about the pivot point P where the drive vehicle 20 is attached to the work platform 100. The work platform 100 turns about a rotation point W which is located at the intersection of the wheel rotation axis A of the work platform 100 and a line V that extends from the pivot point P and is perpendicular to a vector R. The wheel rotation axis A of the work platform 100 provides for the point of rotation because the wheels 105 are locked in their angular position (i.e., the orientation of the wheels 105, which can be lockable caster wheels 105, are fixed relative to the work platform 100). Further, additional wheels 104 on the work platform 100 can be slightly elevated above the work surface 99 by the drive vehicle 20 (see FIG. 4).

The processing circuit 3 1uses various data items to perform the automated alignment of the work platform 100. As illustrated in FIG. 9, this includes the distance "a" measured between the sensors 40. A distance "b" is the distance between the wheel rotation axis A of the work platform 100 and the pivot point P. A distance "s" is the distance between the sensors 40 at the edge 109 of the work platform 100 and the wheel rotation axis A of the work platform 100. A distance "$d_1$" is the sensed distance between the first sensor 40a and the target object 110. Distance "$d_2$" is the sensed distance between the second sensor 40b and the target object 110.

The drive vehicle 20 includes a forward motion indicated by vector R that extends from the pivot point P. A line H extends along the longitudinal centerline of the drive vehicle 20 from the pivot point P and is perpendicular to the wheel rotation axis A of the work platform 100. The line V extends from the pivot point P and is perpendicular to the forward motion vector R. The point W is the intersection of line V and the wheel rotation axis A of the work platform 100. A line T extends along the edge of the target object 110.

The processing circuit 31 calculates the positioning of the work platform 100 based on the readings from the two sensors 40a, 40b that are spaced apart along the work platform 100. Using the distance readings and the geometry of the work platform 100, the processing circuit 31 calculates an angle between the work platform 100 and the target object 110. This target object angle α is the angle between the wheel rotation axis A of the work platform 100 and line T that aligns with the front of the target object 110. The target object angle α is defined in equation (1):

$$\alpha = \text{atan}(d_1 - d_2/a) \qquad \text{(Eq. 1)}$$

A drive vehicle angle β is measured by the rotation sensor 28 and is an angle of the work platform 100 relative to the drive vehicle 20. This angle β is formed by vector R indicating the forward motion of the drive vehicle 20 and the line H that extends from the pivot point P and is perpendicular to the wheel rotation axis A and is the longitudinal centerline H of the work platform 100.

The processing circuit 31 uses feedback of the drive vehicle angle β, along with the geometry of the work platform 100 including the location of the wheels 105, the longitudinal centerline H of the work platform 100, the wheel rotation axis A, the sensor separation distance a, and the pivot point P, to calculate a required vector for the drive vehicle 20 to follow to achieve the target object angle α for alignment. After angle alignment is achieved, the processing circuit 31 adjusts angle β to maintain the target object angle α while moving the work platform 100 towards the target object 110. The processing circuit 31 uses feedback from the sensors 40 until the desired offset distance between the work platform 100 and the target object 110 is achieved. At this point, the processing circuit 31 stops the drive vehicle 20. Continuous feedback based on the readings from the sensors 40 provides for the necessary adjustments in the drive vehicle angle β to allow for the necessary alignment.

The rotational alignment of the work platform 100 is accomplished by determining the rotation point of the work platform 100 that is needed for alignment of the target object 110 without colliding with the target object 110. The processing circuit 31 sets a platform pivot point W at an intersection of the vector V and the wheel rotation axis A of the work platform 100. In order to produce a collision-free path for of the work platform 100 relative to the target object 110, the rotation aspect of the motion path is to be completed before the desired distance away from the target object 110 is reached. As illustrated in FIG. 10, this means that the rotation point distance D2 of the work platform 100 is less than or equal to the distance D1 of the intersection point of the boundary edge line of the target object 110 and wheel rotation axis A of the work platform 100.

FIG. 10 illustrates a positioning in which the work platform 100 can be aligned prior to contacting against the target object 110. The distance D2 is less than or equal to the distance D1. FIG. 11 illustrates a positioning in which the work platform 100 will not achieve alignment before contacting against the target object 110. This contact occurs because D2 is greater than D1. In FIG. 11, the drive vehicle 20 is adjusted to change the drive vehicle angle β (which would involve increasing angle β from the situation shown here) to allow for the necessary alignment.

The processing circuit 31 can continuously calculate the various distances and alignments during movement of the drive vehicle 20. A minimum drive vehicle angle β is determined based on the initial target object angle α and the desired approach offset distance. The minimum drive vehicle angle β is defined in equation (2):

$$\beta_{min} = \text{atan}(b/((s+(d_1+d_2)/2)/\tan(\alpha))) \qquad \text{(Eq. 2)}$$

In practice, the initial drive vehicle angle β can be set to be greater than the minimum drive vehicle angle β to achieve alignment before the desired offset distance is achieved. The processing circuit 31 continuously computes the target object angle α while moving towards the target object 110 until the target object angle α becomes zero.

The processing circuit 31 can also control the speed of the drive vehicle 20 as it moves towards the target object 110. The speed can be continuously computed during the time that the target object angle α is not equal to zero. The speed can be calculated based on equation (3):

$$\text{Speed} = K_p * \alpha + \sin(\alpha) * (K_{min\_yaw\_rate}) \qquad \text{(Eq. 3)}$$

The processing circuit 31 is provided with the various data points and dimensions to correctly determine the various calculations for movement of the work platform 100, such as the target object angle α, pivot point P, and sensor offsets. Motion control equations with kinematic dimension variables integrated into them can be pre-programmed with the processing circuit 31 and memory circuit 32. This can include setting the variables (such as a, b, and s).

The kinematics variables can be set in various manners, such as hard coding them into a motion control app, having the operator enter them manually through the control unit 60 or inputs on the drive vehicle 20, and having the operator select an ID number associated with the work platform 100 that loads a file containing the variables at run time, or having some type of automated selection process. One design can load the data based on RFI tags on the work platform 100 scanned by the drive vehicle 20 and/or control unit 60.

Figure 12:
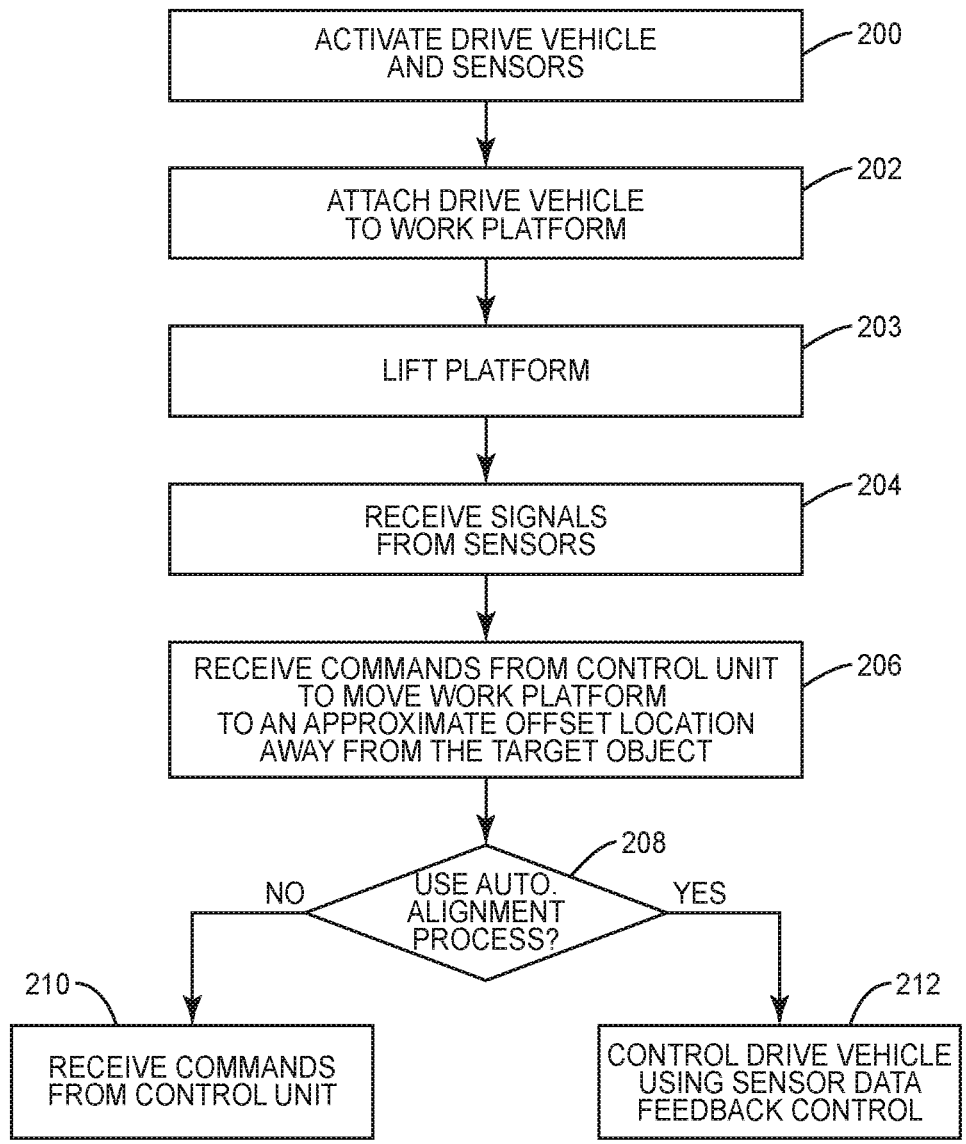
FIG. 12 is a flowchart diagram of a method of using a mover system to align and position a work platform relative to a target object.

FIG. 12 illustrates a method of aligning a work platform 100 relative to a target object 110. The drive vehicle 20 and sensors 40 are activated (block 200). This can be completed at the components themselves, or remotely such as through the control unit 60. The drive vehicle 20 can be positioned relative to the work platform 100 and attached to the work platform 100 (block 202).

Once attached, the mount 22 can be lifted through the lift mechanism 27 (block 203). This can elevate a section of the work platform 100. This can include elevating the work platform 100 such that just the wheels 105 on and/or towards the edge 109 remain in contact with the work surface 99. This can also place a load on the drive vehicle 20 to increase its traction with the work surface 99. At this stage, the movement of the work platform 100 occurs along the wheel rotation axis A of the work platform 100 that extends through the wheels 105 that are in contact with the work surface 99, and the mount 22 that is pivotally connected to the body 21 of the drive vehicle 20.

The drive vehicle 20 receives signals from the sensors 40 indicating the distance from the target object 110 (block 204). Signals from the sensors 40 can begin to be received once the drive vehicle 20 is attached to the work platform 100. The processing circuit 31 can signal the sensors 40 and/or processing circuits 42 to begin sending the signals. In one design, activation of the lift mechanism 27 to elevate the work platform 100 causes the sensors 40 to begin sending the signals.

The signals from the sensors 40 are also sent to the display 50. This causes the applicable lights 51 to be illuminated for the visual indication of the aligning and/or positioning for the operator that is controlling the drive vehicle 20.

Commands can continue to be received from the operator to control the drive vehicle 20 and thus the movement of the work platform 100 (block 206). These commands can be received from the control unit 60 from the operator who is located remotely away from the drive vehicle 20. The operator through the control unit 60 moves the work platform 100 into an approximated offset location away from the target object 110.

The operator determines whether to use the automatic alignment process to control the movement of the work platform 100 (block 208). If the automatic alignment process is not to be used, the movement can be controlled by the operator through the control unit 60 (block 210). The operator can observe the physical location of the work platform 100 relative to the target object 110 in controlling the movement. Additionally or alternatively, the operator can also observe the display 50 to determine the alignment and/or position.

If automatic alignment process is to be used (block 208), the operator can input a command through the control unit 60 indicating that the automatic alignment process is to take over the movement (block 212). Once activated, the processing circuit 31 controls the movement based on the sensor data feedback.

The designs above include the processing circuit 31 positioned in the drive vehicle 20. The processing circuit 31 can also be located away from the drive vehicle 20.

A variety of different work platforms 100 can be used with the mover system 10.

Figure 13:
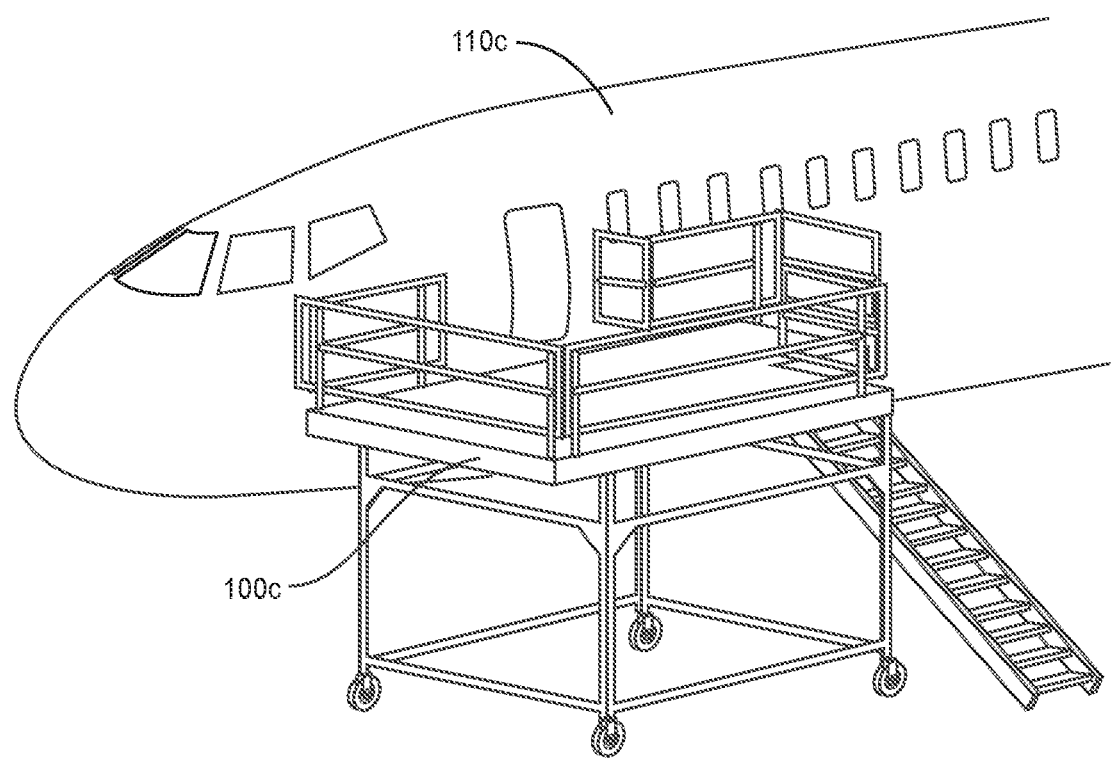
FIG. 13 is a perspective view of a work platform.

FIG. 13 illustrates a work platform 100c with an elevated work surface to position workers and/or equipment relative to target object 110c. The work platform 100c can also include steps to provide for egress to and from the elevated work surface.

Figure 14:
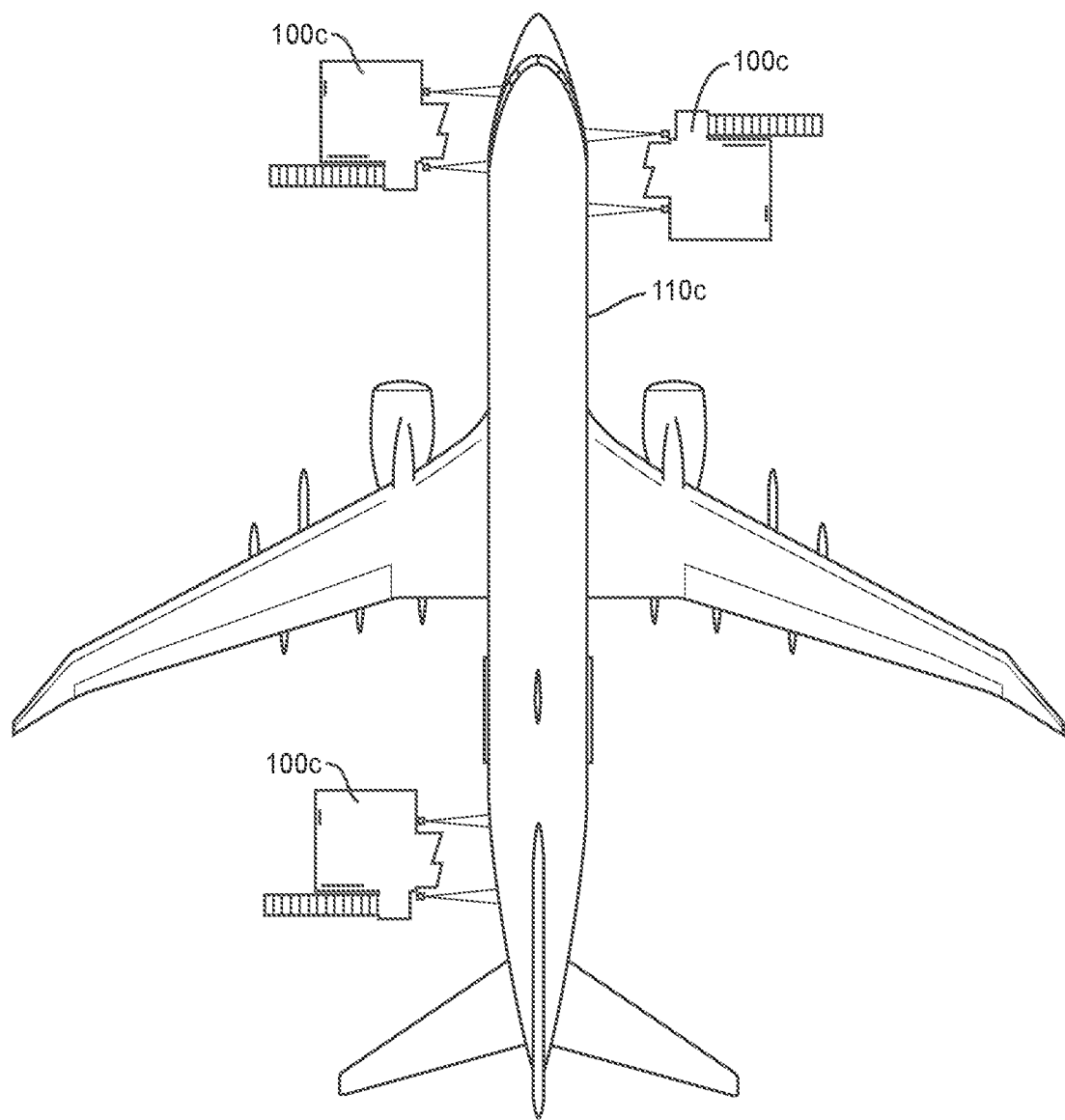
FIG. 14 is a top view of work platforms located at an aircraft.

The mover system 10 can be used in a variety of different environments to work on a variety of different target objects. FIGS. 13 and 14 includes one example in which the target object 110c is an aircraft. One or more work platforms 100c can be used to work on different sections of the target object 110c. The mover system 10 can be used with a variety of vehicles. One vehicle includes a commercial aircraft that includes rows of seats each configured to accommodate a passenger. Other vehicles include but are not limited to manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne vehicles, unmanned surface water borne vehicles, manned sub-surface water borne vehicles, unmanned sub-surface water borne vehicles, ships, and combinations thereof.

Figure 15:
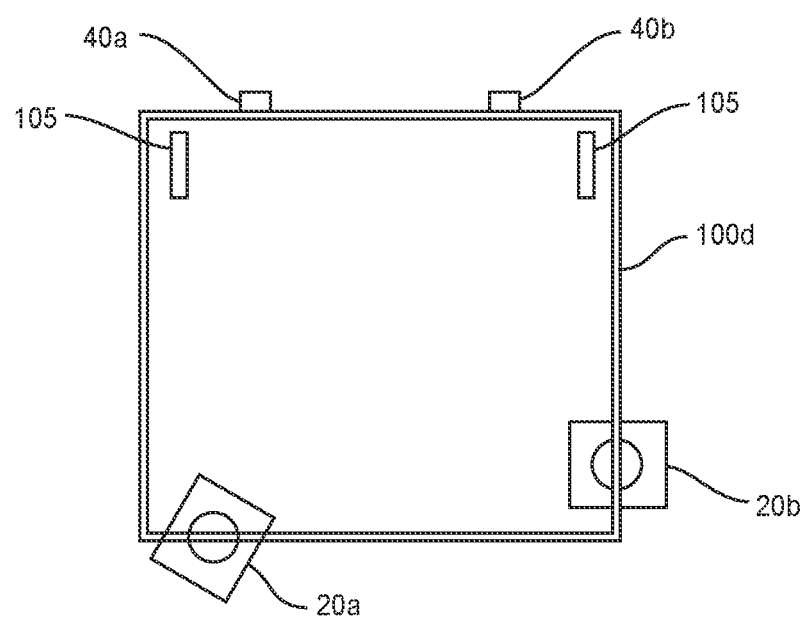
FIG. 15 is a schematic diagram illustrating a top view of multiple drive vehicles attached to a work platform to position and align the work platform relative to a target object.

The examples above include a single drive vehicle 20 attached to a work platform 100. The mover system 10 can also include multiple drive vehicles 20 attached to a work platform 100. The multiple drive vehicles 20 can act in concert to move and align the work platform 100. FIG. 15 illustrates a pair of drive vehicles 20a, 20b attached to a work platform 100d. The wheels 105 on the work platform 100d are castors and able to rotate through various angular positions. Each of the drive vehicles 20a, 20b receives signals from the sensors 40a, 40b. Based on these signals, the drive vehicles 20a, 20b can determine the applicable directional positioning. In addition, the drive vehicles 20a, 20b can communicate between themselves to further determine movements to steer the work platform 100d. In one mover system 10, one of the drive vehicles 20a, 20b is a master and determines the movements and directs the other drive vehicle 20a, 20b. Other mover systems 10 include both drive vehicles 20a, 20b calculating their movements based on the signals from the sensors 40a, 40b.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A system to align a work platform relative to a stationary target object, the system comprising:
   a drive vehicle configured to attach to the work platform at a pivot point and to lift a section of the work platform above a support surface and to move the drive vehicle along the support surface while the section is lifted;
   first and second sensors that are spaced apart on the work platform;
   a rotation sensor;
   a processing circuit configured to:

receive signals from first and second sensors, the signals indicating a first distance between the first sensor and the target object and a second distance between the second sensor and the target object;
calculate based on the signals a target object angle between the work platform and the target object;
calculate based on rotational sensor signals a drive vehicle angle between a forward movement direction of the drive vehicle and a longitudinal centerline of the work platform; and
calculate the target object angle and the drive vehicle angle while the work platform moves with the drive vehicle towards the target object and based on the target object angle and the drive vehicle angle complete a rotational aspect of a motion path of the work platform prior to reaching a zero offset distance between the work platform and the target object.

2. The system of claim 1, wherein based on the rotational sensor signals, the processing circuit is further configured to adjust an angular position of the drive vehicle relative to the work platform at the pivot point while moving the work platform with respect to the target object.

3. The system of claim 1, wherein the processing circuit is further configured to stop the drive vehicle based on sensor data when the work platform reaches the zero offset distance.

4. The system of claim 1, wherein the processing circuit is further configured to elevate the section of the work platform above a work surface such that a limited number of wheels of the work platform remain in contact with the work surface.

5. The system of claim 4, wherein the processing circuit is further configured to extend a lift mechanism on the drive vehicle relative to a body of the drive vehicle and elevate the section of the work platform.

6. A system to align a work platform relative to a stationary target object, the system comprising:
a drive vehicle comprising:
a body;
drive members attached to the body;
a mount pivotally attached to the body, the mount configured to attach to the work platform and configured to be pivotally adjustable relative to the body during operation of one or more of the drive members;
a processing circuit configured to control movement of the drive vehicle;
a first sensor attached to the work platform at a first position, the first sensor configured to detect a first distance at the first position between the work platform and the target object;
a second sensor attached to the work platform at a second position that is spaced away from the first position, the second sensor configured to detect a second distance at the second position between the work platform and the target object;
a rotation sensor to sense an angle of the work platform relative to the drive vehicle;
the processing circuit configured to receive signals from the first and second sensors and the rotation sensor and based on the signals to control movement of the drive vehicle to adjust a spacing and alignment between the work platform and the target object.

7. The system of claim 6, further comprising a lift mechanism attached to the body and to the mount, the lift mechanism configured to elevate the mount relative to the body to lift a section of the work platform.

8. The system of claim 6, wherein the processing circuit calculates based on the signals from the first and second sensors a target object angle that is an angle between the work platform and the target object.

9. The system of claim 6, wherein the processing circuit calculates based on readings from the rotation sensor on the drive vehicle a drive vehicle angle that is an angle between a first line extending in a forward movement direction of the drive vehicle from a pivot point with the work platform and a second line extending from the pivot point and being perpendicular to a wheel rotation axis of the work platform and parallel to a longitudinal centerline of the work platform.

10. The system of claim 6, further comprising a display mounted to the work platform and comprising at least one row of lights, the display illuminates one or more of the lights based on the signals received from the first and second sensors.

11. The system of claim 6, further comprising a control unit that communicates with the processing circuit and control the drive vehicle based on signals received from the control unit.

12. A system to align a work platform relative to a stationary target object, the system comprising:
a drive vehicle comprising a body, a mount configured to attach to the work platform, and a lift mechanism to elevate the mount relative to the body;
a processing circuit configured to control movement of the drive vehicle;
sensors that are spaced apart and configured to detect distances between the work platform and the target object;
a rotation sensor to detect an angle of the work platform relative to the drive vehicle;
the processing circuit configured to receive signals from the first and second sensors and the rotation sensor and based on the signals to control movement of the drive vehicle when the lift mechanism elevates the mount above the body to adjust a spacing and alignment between the work platform and the target object.

13. The system of claim 12, wherein the drive vehicle comprises wheels that are rotated to adjust an angular position between the body and the mount.

14. The system of claim 12, wherein the mount is pivotally connected to the body.

15. The system of claim 12, wherein the lift mechanism comprises an extendable arm that is movable between a retracted position in proximity to the body and an extended position away from the body.

16. The system of claim 12, wherein each of the sensors comprise an emitter configured to emit a pulsed laser light and a receiver configured to receive reflected pulses.

17. The system of claim 12, further comprising a control unit configured to remotely control the drive vehicle.

18. The system of claim 12, wherein the processing circuit is configured to calculate based on the signals from the sensors a target object angle between the work platform and the target object.

19. The system of claim 12, wherein the processing circuit is configured to sense an angle of a forward motion of the drive vehicle relative to a longitudinal centerline of the work platform and adjust a position of the drive vehicle relative to the work platform based on the angle.

20. The system of claim 12, further comprising a display configured to provide a visual indication of a position of the work platform relative to the target object, the display comprising a plurality of lights aligned in a horizontal row.

* * * * *